(12) United States Patent
Takizawa

(10) Patent No.: US 12,718,590 B2
(45) Date of Patent: Aug. 25, 2026

(54) INFORMATION PROCESSING DEVICE

(71) Applicant: PIONEER CORPORATION, Tokyo (JP)

(72) Inventor: Satoru Takizawa, Kawagoe (JP)

(73) Assignee: PIONEER CORPORATION, Tokyo (JP)

( * ) Notice: Subject to any disclaimer, the term of this patent is extended or adjusted under 35 U.S.C. 154(b) by 81 days.

(21) Appl. No.: 18/690,692

(22) PCT Filed: Apr. 15, 2022

(86) PCT No.: PCT/JP2022/017921
§ 371 (c)(1),
(2) Date: Mar. 8, 2024

(87) PCT Pub. No.: WO2023/162281
PCT Pub. Date: Aug. 31, 2023

(65) Prior Publication Data
US 2026/0120479 A1 Apr. 30, 2026

(30) Foreign Application Priority Data
Feb. 28, 2022 (JP) ................................ 2022-030142

(51) Int. Cl.
*G06V 20/58* (2022.01)
*G06V 20/62* (2022.01)

(52) U.S. Cl.
CPC .......... *G06V 20/582* (2022.01); *G06V 20/584* (2022.01); *G06V 20/625* (2022.01); *G06V 2201/07* (2022.01)

(58) Field of Classification Search
CPC . G06V 20/582; G06V 20/584; G06V 2201/07
(Continued)

(56) References Cited

U.S. PATENT DOCUMENTS 9,651,499 B2 * 5/2017 Mahuna ............. G01N 21/8851
2016/0155004 A1 6/2016 Shiraishi et al.
2019/0310091 A1 * 10/2019 Maeda .................. G01C 21/30

FOREIGN PATENT DOCUMENTS

JP 2017111762 A 6/2017
JP 2017194898 A * 10/2017
(Continued)

OTHER PUBLICATIONS

International Search Report for PCT/JP2022/017921 mailed Jul. 5, 2022, 5 pages.
(Continued)

*Primary Examiner* — William C Vaughn, Jr.
*Assistant Examiner* — Asteways Gettu Zewede
(74) *Attorney, Agent, or Firm* — NIXON & VANDERHYE

(57) ABSTRACT

A detection target is set according to various imaging situations, and confirmed in real time that the detection target could be captured. In an information processing device, an information collection unit collects information including travel information of a moving body and peripheral information thereof. The imaging unit continuously captures images. Then, an image for a predetermined time from among the images captured by the imaging unit is set as an evaluation target image, with either a case where the basic information satisfies the predetermined condition or the case where the instruction operation is received by the evaluation target image setting unit as a trigger. Then, the detection target setting unit sets the detection target object on the basis of the trigger and the basic information related to the evaluation target image. Then, the output unit reports that there is the set detection object from the evaluation target image.

20 Claims, 5 Drawing Sheets

(58) Field of Classification Search
USPC .......................................................... 240/148
See application file for complete search history.

(56) References Cited

FOREIGN PATENT DOCUMENTS

| | | | | |
|---|---|---|---|---|
| JP | 2019061514 | A | * | 4/2019 |
| JP | 2021002163 | A | | 1/2021 |

OTHER PUBLICATIONS

Written Opinion of the ISA for PCT/JP2022/017921 mailed Jul. 5, 2022, 4 pages.
Extended European Search Report, issued in European Patent Application No. 22928803.0 dated Jan. 27, 2026.

* cited by examiner

START
S100
ACQUIRE IMAGE ACQUISITION BASIC INFORMATION
S200
DETERMINE
NO
YES
S300
SET UPLOAD TARGET IMAGE
S400
TRANSMIT
S500
DETERMINE DETECTION TARGET
S600
OUTPUT VOICE
S700
RECEIVE SECOND INSTRUCTION OPERATION
NO
YES
S800
REDETERMINE
S900
REOUTPUT VOICE
END

INFORMATION PROCESSING DEVICE

CROSS-REFERENCE TO RELATED APPLICATIONS

This application is the U.S. national phase of International Application No. PCT/JP2022/017921 filed Apr. 15, 2022 which designated the U.S. and claims priority to JP 2022-030142 filed Feb. 28, 2022, the entire contents of each of which are hereby incorporated by reference.

TECHNICAL FIELD

The present invention relates to an information processing device.

BACKGROUND ART

A drive recorder including a camera mounted on a vehicle and a recording unit that records an image captured by the camera has been known (see, for example, Patent Document 1).

Patent Document 1 discloses a drive recorder including a determination unit that determines whether or not a predetermined object is captured in an image, and a transmission unit that transmits the image in which the predetermined object has been captured to a server device when the determination unit determines that the predetermined object has been captured.

CITATION LIST

Patent Document

Patent Document 1: JP 2021-002163-A

SUMMARY OF INVENTION

Technical Problem

In the drive recorder as disclosed in Patent Document 1, for example, it is necessary for the user to set in advance in detail a determination target for determining whether or not the user has desired to leave a video image, such as a crack or freezing of a road surface, and has actually captured the video image. For this reason, when it is attempted to set the determination target according to various changing imaging situations, it is necessary to assume all situations, and it may be difficult to set the determination target in advance. Therefore, it is difficult to set the detection target according to various imaging situations, and it is difficult to confirm in real time that the detection target according to the imaging situation has been captured.

As an example of the problem to be solved by the present invention, a detection target is set according to various imaging situations, and it is confirmed in real time that the detection target could be captured.

Solution to Problem

In order to solve the above problem, an invention according to claim 1 includes: an information collection unit that collects basic information including travel information of a moving body and peripheral information of the moving body; an imaging unit that continuously captures images; an evaluation target image setting unit that sets, as an evaluation target image, an image for a predetermined time from among images captured by the imaging unit, with either a case where the basic information satisfies a predetermined condition or a case where an instruction operation is received as a trigger; a detection target setting unit that sets a detection target object on a basis of the trigger related to the evaluation target image and the basic information; and an output unit that reports that the detection target object set from the evaluation target image has been present.

The invention according to claim 2 includes: an information collection unit that collects basic information including travel information of a moving body and peripheral information of the moving body; an imaging unit that continuously captures images; an evaluation target image setting unit that sets, as an evaluation target image, an image for a predetermined time from among images captured by the imaging unit, with either a case where the basic information satisfies a predetermined condition or a case where an instruction operation is received as a trigger; a detection target setting unit that sets a detection target object on a basis of the trigger related to the evaluation target image and the basic information; and an output unit that reports that the detection target object set from the evaluation target image has been absent.

The invention according to claim 3 includes: an information collection unit that collects basic information including travel information of a moving body and peripheral information of the moving body; an imaging unit that continuously captures images; an evaluation target image setting unit that sets, as an evaluation target image, an image for a predetermined time from among images captured by the imaging unit, with either a case where the basic information satisfies a predetermined condition or a case where an instruction operation is received as a trigger; a detection target setting unit that sets a detection target object on a basis of the trigger related to the evaluation target image and the basic information; and an output unit that reports presence or absence of the detection target object set from the evaluation target image.

The invention according to claim 11 is an information processing method executed by a computer, including: an information collection step of collecting basic information including travel information of a moving body and peripheral information of the moving body; an imaging step of continuously capturing images; an evaluation target image setting step of setting, as an evaluation target image, an image for a predetermined time from among images captured by the imaging step, with either a case where the basic information satisfies a predetermined condition or a case where an instruction operation is received as a trigger; a detection target setting step of setting a detection target object on a basis of the trigger related to the evaluation target image and the basic information; and an output step of reporting that the detection target object set from the evaluation target image has been present.

The invention according to claim 12 causes a computer to execute the information processing method according to claim 11 as an information processing program.

The invention according to claim 13 causes the information processing program according to claim 12 to be stored in a computer-readable storage medium.

BRIEF DESCRIPTION OF DRAWINGS

FIG. 1 is a schematic configuration diagram of an information processing device according to a first example of the present invention.

FIG. 2 is a configuration diagram of a terminal device illustrated in FIG. 1.

FIG. 3 is a configuration diagram of a server device illustrated in FIG. 1.

FIG. 4 is a diagram illustrating types of classification performed by a scene identifying unit illustrated in FIG. 3.

DESCRIPTION OF EMBODIMENTS

Figure 5:
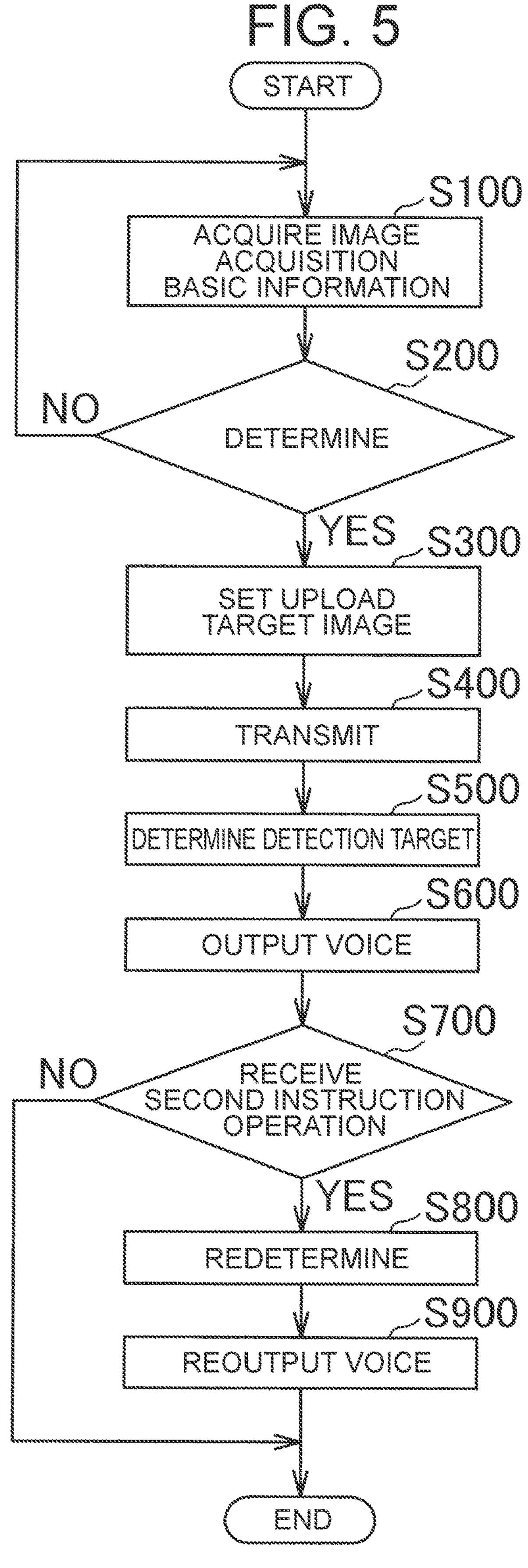
FIG. 5 is a flowchart of an operation of the information processing device illustrated in FIG. 1.

Hereinafter, an information processing device according to an embodiment of the present invention will be described. In an information processing device according to an embodiment of the present invention, an information collection unit collects basic information including travel information of a moving body and peripheral information of the moving body. Then, the imaging unit continuously captures images. Then, an image for a predetermined time from among the images captured by the imaging unit is set as an evaluation target image, with either a case where the basic information satisfies the predetermined condition or the case where the instruction operation is received by the evaluation target image setting unit as a trigger. Then, the detection target setting unit sets the detection target object on the basis of the trigger and the basic information related to the evaluation target image. Then, the output unit reports that there is the set detection object from the evaluation target image. In this way, since the setting of the detection target object is performed on the basis of the trigger and the basic information related to the evaluation target image, it is possible to reduce a trouble for the user of the information processing device to set the detection target object in detail in advance. Then, since the presence of the detection target object is reported by the output unit, a driver can confirm in real time that the image of the detection target has been acquired. This makes it possible to set the detection target object according to various imaging situations such as a case where the basic information satisfies a predetermined condition or a case where an instruction operation is received, and to confirm in real time that the detection target object has been captured.

Further, in an information processing device according to an embodiment of the present invention, an information collection unit collects basic information including travel information of a moving body and peripheral information of the moving body. Then, the imaging unit continuously captures images. Then, an image for a predetermined time from among the images captured by the imaging unit is set as an evaluation target image, with either a case where the basic information satisfies the predetermined condition or the case where the instruction operation is received by the evaluation target image setting unit as a trigger. Then, the detection target setting unit sets the detection target object on the basis of the trigger and the basic information related to the evaluation target image. Then, the output unit reports that there is no set detection object in the evaluation target image. In this way, since the setting of the detection target object is performed on the basis of the trigger and the basic information related to the evaluation target image, it is possible to reduce a trouble for the user of the information processing device to set the detection target object in detail in advance. Then, since the absence of the detection target object is reported by the output unit, the driver can confirm in real time that the image of the detection target object could not be acquired. This makes it possible to set the detection target object according to various imaging situations such as a case where the basic information satisfies a predetermined condition or a case where an instruction operation is received, and to confirm in real time that the detection target object could not be captured. Also, this makes it possible to quickly respond to a fact that the detection target object could not be captured.

Further, in an information processing device according to an embodiment of the present invention, an information collection unit collects basic information including travel information of a moving body and peripheral information of the moving body. Then, the imaging unit continuously captures images. Then, an image for a predetermined time from among the images captured by the imaging unit is set as an evaluation target image, with either a case where the basic information satisfies the predetermined condition or the case where the instruction operation is received by the evaluation target image setting unit as a trigger. Then, the detection target setting unit sets the detection target object on the basis of the trigger and the basic information related to the evaluation target image. Then, the output unit reports the presence or absence of the detection target object set from the evaluation target image. In this way, since the setting of the detection target object is performed on the basis of the trigger and the basic information related to the evaluation target image, it is possible to reduce a trouble for the user of the information processing device to set the detection target object in detail in advance. Then, since the presence or absence of the detection target object is reported by the output unit, the driver can check whether or not the image of the detection target object has been acquired in real time. This makes it possible to set the detection target object according to various imaging situations such as a case where the basic information satisfies a predetermined condition or a case where an instruction operation is received, and to confirm in real time whether or not the detection target object could be captured.

Furthermore, the output unit may include a voice output device that outputs voice. In this way, any of the presence of the detection target, the absence of the detection target, and the presence or absence of the detection target object is output by voice. Therefore, for example, in a case where the information processing device has an image display function, the driver can check whether or not the image of the detection target object could be acquired in real time without interrupting driving or checking the image by distracting from driving, or the like. In addition, since the output unit can be configured by the voice output device, the present invention can also be applied to a terminal that does not have an image display function.

Furthermore, the information collection unit, the imaging unit, the evaluation target image setting unit, and the output unit may be provided in a terminal device that moves together with the moving body. Then, the detection target setting unit may be provided in a server device capable of communicating with the terminal device. The evaluation target image may be configured by the upload target image that can be uploaded to the server device, the upload target image may be transmitted from the terminal device to the server device, and the detection target information on the detection target object may be transmitted from the server device to the terminal device. In this way, since the setting of the detection target object can be performed on the server device side, a load on the terminal device side can be reduced.

Furthermore, the imaging unit, the evaluation target image setting unit, and the output unit may be provided in a terminal device that moves together with the moving body. Then, the information collection unit and the detection target setting unit may be provided in a server device capable of communicating with the terminal device. The evaluation target image may be configured by the upload target image that can be uploaded to the server device, the upload target image may be transmitted from the terminal device to the server device, and the detection target information on the detection target object may be transmitted from the server device to the terminal device. In this way, since the basic information can be collected on the server device side, a load on the terminal device side can be reduced.

Furthermore, the information collection unit, the imaging unit, the evaluation target image setting unit, the detection target setting unit, and output unit may be provided in a terminal device that moves together with the moving body. Furthermore, in this case, the evaluation target image may include a non-overwriting recorded image. With this configuration, the information processing device can be configured by the terminal device without the server device or the like.

Further, the instruction operation is performed by the utterance of the operator who performs the instruction operation, and the detection target object may not be included in the utterance. With the above configuration, it is possible to perform an instruction operation serving as a trigger for setting the evaluation target image by the utterance of the operator. Then, since the detection target object is not necessarily included in the utterance, for example, the operator only needs to perform a simple utterance such as "take a picture", and it is possible to reduce time and effort to set the detection target object in detail.

In addition, the travel information may include at least one of information on acceleration of the moving body, position information of the moving body, information on a traveling direction of the moving body, and information on parking or stopping of the moving body. Then, the peripheral information may include at least one of time information, weather information, and traffic jam situation information. In addition, the detection object may include at least one of another moving body other than the moving body, a license plate, a person, an animal other than the person, a traffic light, a road sign, a road surface sign, and a predetermined landmark. In this way, it is possible to set various detection objects according to the imaging situation from among the evaluation target images by using various imaging situations as triggers of setting of the evaluation target image. Therefore, for example, in a case where the moving body detects sudden braking, the evaluation target image is set using the information of the acceleration as a trigger, and another moving body (in this case, another moving body that may have caused the sudden braking) other than the moving body or the license plate of the moving body can be set as the detection target object from the evaluation target image.

Furthermore, in a case where the detection target object to be output is not a desired target object desired by an operator who performs the instruction operation and the instruction operation is repeated by the operator, the output unit may report any one of presence of the desired target object, absence of the desired target object, and presence or absence of the desired target object from the evaluation target image. In this way, the operator who has received the report from the output unit can receive the re-report about the presence or absence of the desired target, and thus, even when the setting of the detection target object by the detection target setting unit is different from a desire of the operator, it is possible to reliably confirm the presence or absence of the desired target.

Furthermore, an information processing method according to an embodiment of the present invention is an information processing method executed by a computer. In the information processing method, in the information collection step, basic information including travel information of a moving body and peripheral information of the moving body is collected. Then, in the imaging step, imaging is continuously performed. Then, an image for a predetermined time from among the images captured in the imaging step is set as an evaluation target image, with either a case where the basic information satisfies the predetermined condition or the case where the instruction operation is received in the evaluation target image setting step as a trigger. Then, in the detection target setting step, the detection target object is set on the basis of the trigger and the basic information related to the evaluation target image. Then, in the output step, the presence of the detection object set from the evaluation target image is reported. With the above configuration, it is possible to set the detection target object according to various imaging situations such as a case where the basic information satisfies a predetermined condition or a case where an instruction operation is received, and to confirm in real time that the detection target object has been captured.

Furthermore, the above-described information processing method may be executed by a computer as an information processing program. With the above configuration, it is possible to set the detection target object by using the computer according to various imaging situations such as a case where the basic information satisfies a predetermined condition or a case where an instruction operation is received, and to confirm in real time that the detection target object has been captured.

Furthermore, the above-described information processing program may be stored in a computer-readable storage medium. In this way, the information processing program can be distributed alone in addition to being incorporated in the device, and version upgrade or the like can be easily performed.

Example 1

Figures 1, 2:
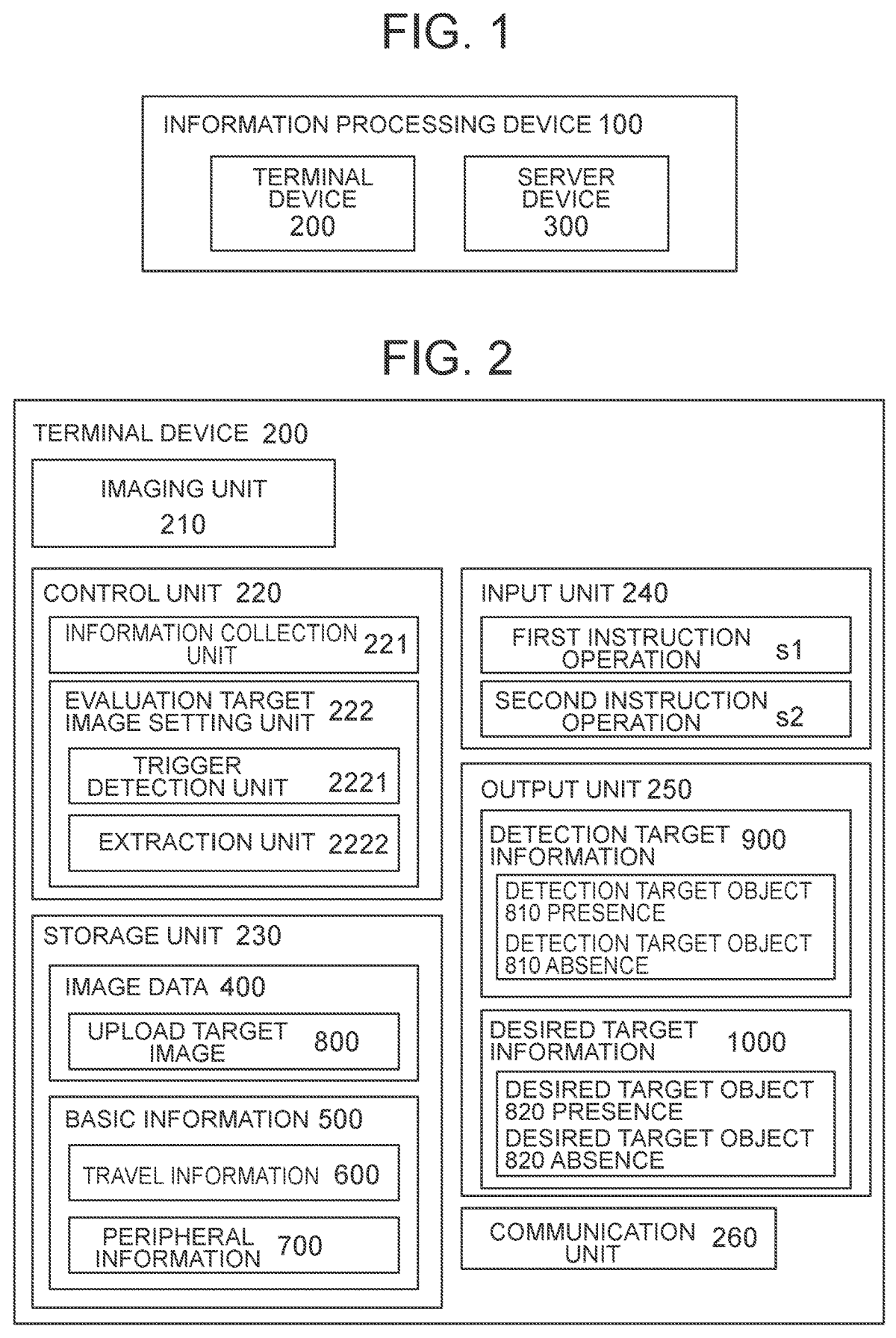

FIG. 1 is a schematic configuration diagram of an information processing device 100 according to a first example of the present example. The information processing device 100 includes a terminal device 200 and a server device 300. The terminal device 200 is, for example, a device (for example, a drive recorder) that moves together with a vehicle (moving body) or a device (for example, a smartphone) carried by a person. The server device 300 is, for example, a device owned by an administrator who manages information obtained from the terminal device 200, and is provided to be able to communicate with the terminal device 200.

As illustrated in FIG. 2, the terminal device 200 includes an imaging unit 210, a control unit 220, a storage unit 230, an input unit 240, an output unit 250, and a communication unit 260.

The imaging unit 210 includes, for example, a vehicle exterior imaging camera (not limited to the front, side surfaces and back cameras may be included), a vehicle interior imaging camera, and the like. The control unit 220 includes, for example, a central processing unit (CPU). The storage unit 230 includes a hard disk, a memory, and the like. The input unit 240 includes, for example, a device such as a microphone and an input button. The output unit 250 includes, for example, a device such as a speaker (voice output device that performs output by voice). The communication unit 260 includes a communication device for transmitting and receiving information to and from another device.

The imaging unit 210 is provided integrally with or separately from the terminal device 200, acquires image data 400 (image) inside and outside the vehicle by continuously capturing images and temporarily stores the image data in the storage unit 230 in a ring buffer format.

The control unit 220 is a unit that performs processing for operating the information processing device 100, and includes an information collection unit 221 and an evaluation target image setting unit 222.

The information collection unit 221 performs processing of collecting basic information 500. The basic information 500 is information necessary for estimating a situation when the imaging unit 210 captures an image, and includes travel information 600 of the moving body and peripheral information 700 of the moving body. The travel information 600 includes, for example, at least one of information on acceleration of the vehicle, position information of the vehicle, information on a traveling direction of the vehicle, and information on parking or stopping of the vehicle. The peripheral information 700 includes, for example, at least one of information on time such as date and time, information on weather, and information on a traffic jam situation. In addition, the peripheral information 700 may include information on tailgating for vehicles around the own vehicle.

The information collection unit 221 acquires the basic information 500 from, for example, a global positioning system (GPS) receiver, various sensors such as a gyro sensor and an acceleration sensor, an external device that transmits weather information and traffic information, or the like in a real time and stores the acquired basic information in the storage unit 230.

The evaluation target image setting unit 222 sets, as an upload target image 800 (evaluation target image), image data for a predetermined time including a time of detection of the trigger from among the image data 400 captured by the imaging unit 210, with any one of a case where the basic information 500 satisfies the predetermined condition and a case where the input unit 240 receives a first instruction operation s1 (instruction operation) as a trigger. The evaluation target image setting unit 222 includes a trigger detection unit 2221 and an extraction unit 2222.

The trigger detection unit 2221 monitors various sensors such as the gyro sensor and the acceleration sensor, the storage unit 230, or a storage unit 320 of the server device 300, and detects that the basic information 500 satisfies a predetermined condition. Examples of the predetermined condition include a condition that "acceleration information of the vehicle has rapidly changed beyond a predetermined threshold". This condition is satisfied, for example, when the vehicle suddenly accelerates, suddenly decelerates, suddenly stops, the vehicle comes into contact with another vehicle, or an impact is applied to the vehicle that is parked or stopped due to a mischief or the like.

Note that this predetermined condition is merely one example, and can be flexibly changed according to the user's desire. For example, "the vehicle has reached the vicinity of a specific spot such as a famous tourist spot or a spot where traffic accidents frequently occur" may be set as the predetermined condition, or "the weather has changed suddenly", "a tailgating behavior of another vehicle has been detected", or the like may be set as the predetermined condition.

The trigger detection unit 2221 detects that the basic information 500 satisfies the above-described condition set in advance. The trigger detection unit 2221 detects that the input unit 240 has received the first instruction operation s1 (instruction operation). The first instruction operation s1 refers to an operation performed by the user (operator) of the information processing device 100, and in the present example, mainly refers to an operation performed by utterance of the user. The first instruction operation s1 may be a simple operation that does not specify a target to be detected in detail in advance, such as "capture an image", "start imaging", or "leave video". That is, the utterance may not include a detection target object 810 set by a detection target setting unit 311 described later. In addition, the first instruction operation s1 is not limited to input by voice, and may be, for example, operation by an input button.

The detection target object 810 refers to a target object to be expected to be desirably captured by the user of the information processing device 100, and examples thereof include a moving body other than the vehicle provided with the terminal device 200 in the present example, a license plate of the vehicle, a person, an animal other than the person, a traffic light, a road sign, a road surface sign, and a predetermined landmark such as a famous tourist spot or an imaging spot.

Note that, as described above, since the imaging unit 210 continuously captures an image without receiving the first instruction operation s1, "capture an image", "start imaging", "leave video", and the like of the user here indicate the intention of the user not to overwrite the image data 400 with new image data 400 by performing processing such as overwriting prohibition processing or upload processing on the image data 400 related to the first instruction operation s1.

In the case of detecting either "the basic information 500 satisfies the predetermined condition" or "the input unit 240 receives the first instruction operation s1", the extraction unit 2222 sets image data for a predetermined time including a time of detection of the trigger among the image data 400 temporarily stored in the storage unit 230 as the upload target image 800 that can be uploaded to the server device 300, and extracts the image data from the image data 400. The upload target image 800 is an image configuring the evaluation target image in the above-described embodiment. Note that the time of the upload target image 800 may be dynamically changed according to the type of the trigger detected by the trigger detection unit 2221, or may be constant regardless of the type of the trigger.

As described above, when detecting the above-described trigger, the evaluation target image setting unit 222 sets the image data 400 for a predetermined time including the time of detection of the trigger from the image data 400 captured by the imaging unit 210 as the upload target image 800 (evaluation target image). Then, the evaluation target image setting unit 222 performs processing of assigning the information of the trigger detected by the trigger detection unit 2221 and the basic information 500 corresponding to the time of the upload target image 800 to the extracted upload target image 800 and transmitting the information to the server device 300 through the communication unit 260.

The input unit 240 collects the voice to receive the input of the first instruction operation s1. In addition, the input unit 240 receives an input of a second instruction operation s2 (re-instruction operation) in addition to the first instruction operation s1.

The second instruction operation s2 is an operation performed after the first instruction operation s1, and is an operation performed in a case where the detection target object 810 is not a desired target object 820 desired by the user after the presence or absence of the detection target object 810 is output by voice in the output unit 250 as described later. The second instruction operation s2 is performed by the user asking " . . . (desired target object 820) is not captured?" or the like to prompt the information processing device 100 to redetermine whether or not the desired target object 820 has been captured in the upload target image 800.

In the present embodiment, the input unit 240 is configured to receive input by voice, but for example, an input button or the like corresponding to the first instruction operation s1 and the second instruction operation s2 may be provided in the terminal device 200, and the input of the first instruction operation s1 and the second instruction operation s2 may be received by the input button.

The output unit 250 outputs the presence of the detection target object 810 set from the upload target image 800, the absence of the detection target object 810, or the presence or absence of the detection target object 810 by voice. Specifically, when the content of a detection target information 900 to be described later received by the communication unit 260 from the server device 300 is "detection target object 810 is present", the output unit 250 outputs a voice such as " . . . (detection target object 810) has been captured" on the basis of the result. Furthermore, when the content of the detection target information 900 is "no detection target object 810", the output unit 250 outputs a voice such as " . . . detection target object 810 could not be captured (alternatively, "could not be detected)" on the basis of the result. Furthermore, if the content of the detection target information 900 is "there is one detection target object 810, and there is no other detection target object 810", the output unit 250 outputs a voice such as " . . . (one detection target object 810) could be captured, but . . . (another detection target object 810) could not be captured".

Furthermore, in a case where the detection target object 810 to be voice-output is not the desired target object 820 desired by the user and the input unit 240 has received the second instruction operation s2 (in a case where the instruction operation has been repeated), the output unit 250 outputs, by voice, that the desired target object 820 has been present in the upload target image 800, that the desired target object 820 has not been present, or the presence or absence of the desired target object 820. Specifically, if the content of desired target information 1000 to be described later received by the communication unit 260 from the server device 300 is "desired target object 820 is present", the output unit 250 outputs a voice such as " . . . (desired target object 820) has been captured" on the basis of the result. Furthermore, when the content of the desired target information 1000 is "no desired target object 820", the output unit 250 outputs a voice such as "desired target object 820 could not be captured (alternatively, "it could not be detected)" on the basis of the result. Furthermore, if the content of the desired target information 1000 is "there is one desired target object 820, and there is no other desired target object 820", the output unit 250 outputs a voice such as " . . . (one desired target object 820) could be captured, but . . . (the other desired target object 820) could not be captured".

The communication unit 260 transmits the upload target image 800 extracted by extraction unit 2222 to the server device 300, and receives the detection target information 900 from the server device 300. in a case where the input unit 240 receives the second instruction operation s2, the communication unit 260 transmits information on the second instruction operation s2 to the server device 300, and receives the desired target information 1000 from the server device 300.

Figures 3, 4:
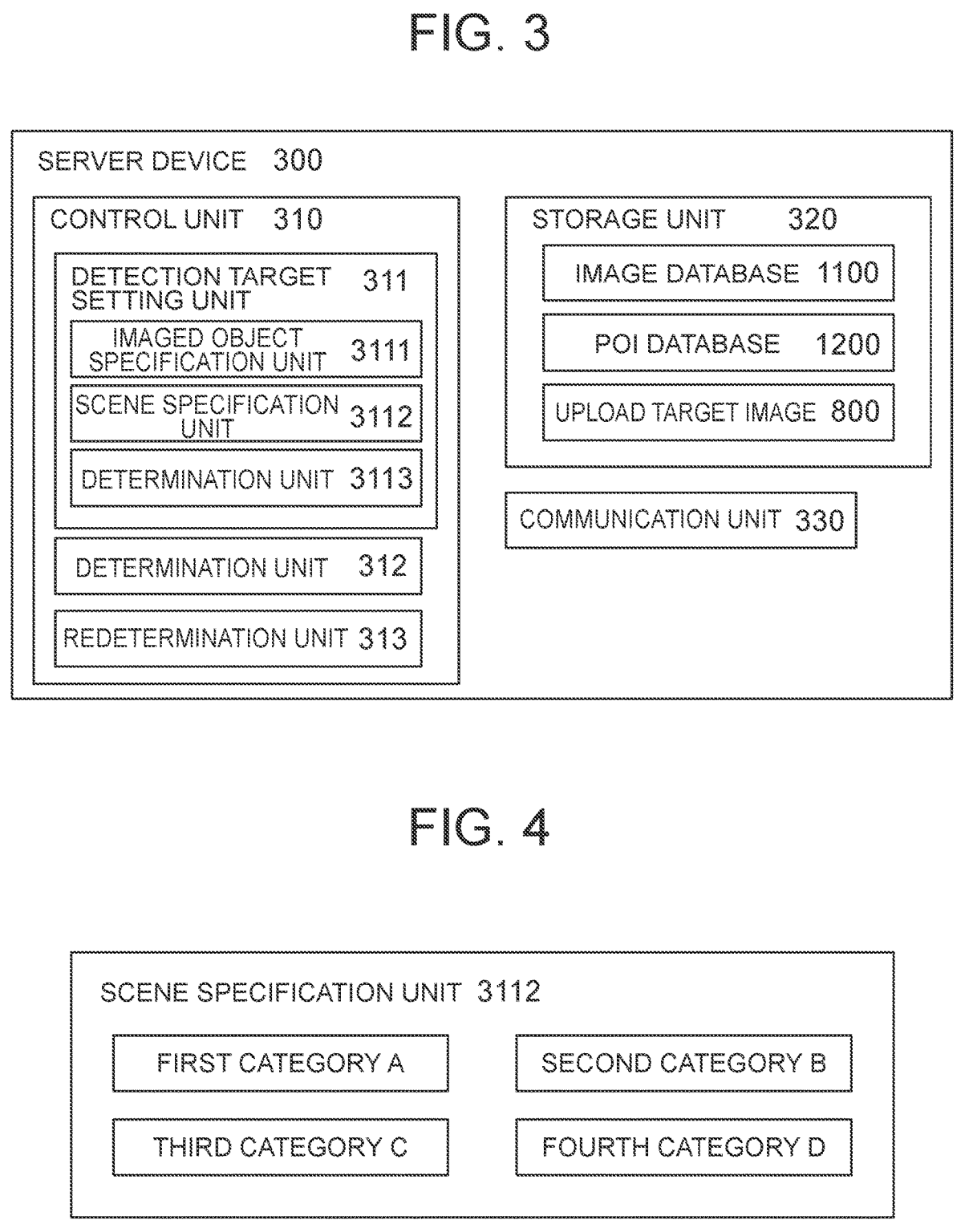

As illustrated in FIG. 3, the server device 300 includes a control unit 310, a storage unit 320, and a communication unit 330.

The control unit 310 includes, for example, a central processing unit (CPU). The storage unit 320 includes a hard disk and a memory. The communication unit 330 includes a communication device for transmitting and receiving information to and from another device.

The control unit 310 is a unit that performs processing for operating the information processing device 100, and includes a detection target setting unit 311, a determination unit 312, and a redetermination unit 313. The detection target setting unit 311 is a portion that sets the detection target object 810 on the basis of the above-described trigger and the basic information 500 related to the upload target image 800, and includes a captured object specification unit 3111, a scene specification unit 3112, and a determination unit 3113.

The captured object specification unit 3111 analyzes the upload target image 800 and specifies a captured object in the upload target image 800. For this specification, a known technique can be used, and detailed description thereof will be omitted, but for example, an image database 1100 for the image captured by the vehicle may be stored in the storage unit 320, and the captured object may be specified using a method such as pattern matching.

The scene specification unit 3112 specifies a situation in which the upload target image 800 has been captured with reference to the information of the trigger and the basic information 500 given to the upload target image 800, and classifies the situation into categories. This category includes, for example, the following four Categories as illustrated in FIG. 4.

A first category A is a category of image capturing point manual image capturing. The first category A indicates that an image related to the upload target image 800 has been captured mainly in the vicinity of a famous tourist spot or an image capturing spot. For example, the first category A is classified in a case where the trigger related to the upload target image 800 is the first instruction operation s1 of the user, and the position information of the vehicle related to the upload target image 800 indicates the vicinity of the position information of any POI in the POI (Point Of Interest) database 1200 recorded in the storage unit 320.

A second category B is a category of emergency manual image capturing. The second category B indicates that an image related to the upload target image 800 has been manually captured by the user in an emergency, mainly in a case where the user has seen an accident other than the own vehicle. For example, the second category B is classified in a case where the trigger related to the upload target image 800 is the first instruction operation s1 of the user, the position information of the vehicle related to the upload target image 800 does not indicate the vicinity of the position information indicated by any POI in the POI database 1200 recorded in the storage unit 320, and the information of the acceleration of the vehicle related to the upload target image 800 does not change beyond a predetermined threshold.

A third category C is a category of a traveling-time automatic image capturing. The third category C indicates that the upload target image 800 is automatically captured during traveling and in an emergency such as when an accident occurs mainly in the traveling own vehicle. A case is classified into the third category C, for example, in which the trigger related to the upload target image 800 is caused by a fact that the acceleration information of the vehicle has rapidly changed beyond a predetermined threshold, and it is found from the content of the basic information 500 that the vehicle has been traveling.

A fourth category D is a category of automatic image capturing during parking and stopping. The fourth category D indicates that the upload target image 800 is automatically captured during parking and stopping and in an emergency such as when an impact is applied to the own vehicle mainly due to mischief or the like of the own vehicle during parking and stopping. A case is classified into the fourth category D, for example, in which the trigger related to the upload target image 800 is caused by a fact that the acceleration information of the vehicle has rapidly changed beyond a predetermined threshold, and it is found from the content of the basic information 500 that the vehicle has been parked or stopped.

The determination unit 3113 determines the object 810 from upload object image 800 with reference to the category classified by scene specification unit 3112.

Specifically, when the category of the upload target image 800 is the first category A, it is determined that the target object to be expected to be desired to be imaged by the user is an object existing in a famous tourist spot or an image capturing spot, and one of the POIs in the POI database 1200 recorded in the storage unit 320 is determined as the detection target object 810.

When the category of the upload target image 800 is the second category B, it is determined that the target object to be expected to be desirably captured by the user is a target object involved in an accident other than the own vehicle, and a vehicle other than the own vehicle, a license plate of the vehicle, a person, an animal other than a person, a traffic light, a road sign, a road surface sign, and the like are determined as the detection target object 810.

In addition, in a case where the category of the upload target image 800 is the third category C, it is determined that the target object expected to be desirably captured by the user is a target object involved in an accident while the own vehicle is traveling, and a vehicle other than the own vehicle, a license plate of the vehicle, a person, an animal other than a person, a traffic light, a road sign, a road surface sign, and the like are determined as the detection target object 810.

In addition, when the category of the upload target image 800 is the fourth category D, it is determined that the target expected to be desirably captured by the user is a target present in the vicinity of the own vehicle, and a person or an animal other than a person, a vehicle other than the own vehicle, a license plate of the vehicle, and the like present in the vicinity of the own vehicle are determined as the detection target object 810. At this time, another vehicle that is moving at the time of vibration detection or another vehicle that performs a door opening/closing operation may be set as the detection target object 810, another vehicle that continues to stop in a parking lot may be set as the detection target, and another vehicle that does not open or close the door may be excluded as the detection target object 810.

The determination unit 312 determines the presence or absence of the detection target object 810 determined by determination unit 3113 from the upload target image 800, and transmits the result as the detection target information 900 from the server device 300 to the terminal device 200 through the communication unit 330. The detection target information 900 may be, for example, information simply about the presence or absence of the detection target object 810, such as "presence of the detection target object 810", "absence of the detection target object 810", and "presence of one detection target object 810, and absence of another detection target object 810", or may be information to which any one of the first category A to the fourth category D is added. In addition, the number of detection target objects 810 may be included.

When the communication unit 330 has received the information on the above-described second instruction operation s2 from the terminal device 200, the redetermination unit 313 determines the presence or absence of the desired target object 820 related to the second instruction operation s2 from the upload target image 800, and transmits the result as the desired target information 1000 from the server device 300 to the terminal device 200 through the communication unit 330. The desired target information 1000 may be, for example, information simply on the presence or absence of the desired target object 820 such as "presence of the desired target object 820", "absence of the desired target object 820", or "presence of one desired target object 820, and absence of another desired target object 820", or may be information to which one of the first category A to the fourth category D is assigned. In addition, the number of the desired target objects 820 may be included.

The storage unit 320 stores upload target image 800 transmitted from terminal device 200. In addition, the storage unit 320 stores the image database 1100 and the POI database 1200 described above.

The communication unit 330 receives the upload target image 800 from the communication unit 260 of the terminal device 200, and transmits the detection target information 900 generated by the determination unit 312 to the terminal device 200. Furthermore, the communication unit 330 receives the information on the second instruction operation s2 from the communication unit 260 of the terminal device 200, and transmits the desired target information 1000 generated by the redetermination unit 313 to the terminal device 200.

Figure 6:
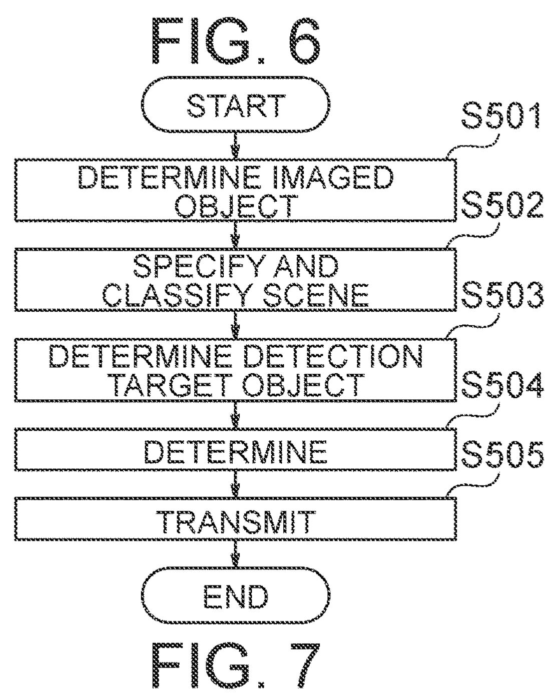
FIG. 6 is a flowchart showing a detailed operation of Step S500 shown in FIG. 5.

Next, an operation (information processing method) of the information processing device 100 having the above-described configuration will be described with reference to flowcharts of FIGS. 5 and 6. Note that the flowcharts of FIGS. 5 and 6 can be configured as a program executed by a computer including a CPU or the like to form an information processing program. The information processing program may be stored in a computer-readable storage medium.

First, in the terminal device 200, the imaging unit 210 starts continuous imaging, and the obtained image data 400 is stored in the storage unit 230. In addition, the information collection unit 221 starts acquisition of the basic information 500 from a global positioning system (GPS) receiver, various sensors such as a gyro sensor and an acceleration sensor, an external device that transmits weather information and traffic information, or the like, and stores the acquired basic information 500 in the storage unit 230 for each hour (Step S100). Step S100 is a step corresponding to the information collection process and the imaging process in the above-described embodiment.

Next, the evaluation target image setting unit 222 monitors the storage unit 230 and the input unit 240 by the trigger detection unit 2221, and determines whether or not a trigger is detected (Step S200). As described above, the trigger is either "the basic information 500 satisfies the predetermined condition" or "the input unit 240 receives the first instruction operation s1 (instruction operation)".

As the predetermined condition at this time, various conditions may be set according to the user's desire, such as "the acceleration information of the vehicle has rapidly changed beyond a predetermined threshold".

The first instruction operation s1 is performed by a user's utterance, and may be a simple operation that does not specify a target to be detected in detail, such as "capture an image", "start imaging", and "leave a video image". The utterance does not need to include the detection target object 810.

If the result of the determination in Step S200 is YES, the process proceeds to Step S300, and if NO, the process returns to Step S100.

In Step S300, the extraction unit 2222 of the evaluation target image setting unit 222 sets image data for a predetermined time including the time of detection of the trigger among the image data 400 temporarily stored in the storage unit 230 as the upload target image 800 and extracts the same from the image data 400. Note that, at this time, the time of the upload target image 800 may be dynamically changed according to the type of the trigger detected by the trigger detection unit 2221, or may be set to be constant regardless of the type of the trigger.

Then, the information on the trigger detected by the trigger detection unit 2221 and the basic information 500 corresponding to the time of the upload target image 800 are attached to the extracted upload target image 800, and transmitted to the server device 300 through the communication unit 260 (Step S400). The above Steps S200 to S400 are steps corresponding to the evaluation target image setting process in the above-described embodiment. Upon completion of Step S400, the process proceeds to Step S500.

In Step S500, the server device 300 sets the detection target object 810, and determines whether or not the detection target object 810 is in the upload target image 800. In Step S500, as illustrated in detail in FIG. 6, first, the captured object specification unit 3111 analyzes the upload target image 800 using a method such as known pattern matching, and specifies a captured object in the upload target image 800 (Step S501).

Next, the scene specification unit 3112 specifies a situation in which the upload target image 800 is captured with reference to the information of the trigger and the basic information 500 given to the upload target image 800, and classifies the situation for each category (Step S502). In Step S502, the upload target image 800 is classified into the first category A, the second category B, the third category C, and the fourth category D according to the contents of the trigger and the basic information 500.

For example, in a case where the trigger related to the upload target image 800 is the first instruction operation s1 of the user, and the position information of the vehicle related to the upload target image 800 indicates the vicinity of the position information of any POI in the POI (Point Of Interest) database 1200 recorded in the storage unit 320, the upload target image 800 is classified into the first category A.

For example, the upload target image 800 is classified into the second category B in a case where the trigger related to the upload target image 800 is the first instruction operation s1 of the user, the position information of the vehicle related to the upload target image 800 does not indicate the vicinity of the position information indicated by any POI in the POI database 1200 recorded in the storage unit 320, and the information of the acceleration of the vehicle related to the upload target image 800 does not change beyond a predetermined threshold.

Furthermore, for example, in a case where the trigger related to the upload target image 800 is caused by a fact that the acceleration information of the vehicle has rapidly changed beyond a predetermined threshold, and it is found from the content of the basic information 500 that the vehicle has been traveling, the upload target image 800 is classified into the third category C.

Furthermore, for example, in a case where the trigger related to the upload target image 800 is caused by a fact that the acceleration information of the vehicle has rapidly changed beyond a predetermined threshold, and it is found from the content of the basic information 500 that the vehicle has been parked or stopped, the upload target image 800 is classified into the fourth category D.

When the upload target image 800 is classified into each category in Step S502, the determination unit 3113 determines detection target object 810 according to the category (Step S503).

For example, in a case where the category of the upload target image 800 is the first category A, the determination unit 3113 determines that the target object expected to be desirably captured by the user is an object existing in a famous tourist spot or a photographing spot, and determines any POI in the POI database 1200 recorded in the storage unit 320 as the detection target object 810.

Furthermore, in a case where the category of the upload target image 800 is the second category B, the determination unit 3113 determines that the target object expected to be desirably captured by the user is a target object related to an accident other than the own vehicle, and determines a vehicle other than the own vehicle, a license plate of the vehicle, a person, an animal other than a person, a traffic light, a road sign, a road surface sign, and the like as the detection target object 810.

Furthermore, in a case where the category of the upload target image 800 is the third category C, the determination unit 3113 determines that the target object expected to be desirably captured by the user is a target object related to an accident while the own vehicle is traveling, and determines a vehicle other than the own vehicle, a license plate of the vehicle, a person, an animal other than a person, a traffic light, a road sign, a road surface sign, and the like as the detection target object 810.

In addition, when the category of the upload target image 800 is the fourth category D, the determination unit 3113 determines that the target object expected to be desirably captured by the user is a target present in the vicinity of the own vehicle, and determines a person or an animal other than a person, a vehicle other than the own vehicle, a license plate of the vehicle, and the like present in the vicinity of the own vehicle as the detection target object 810. The above Steps S501 to S503 correspond to the detection target setting process in the above-described embodiment.

When the detection target object 810 is determined in Step S503, the determination unit 312 determines the presence or absence of the detection target object 810 from the upload target image 800 (Step S504), and transmits the result as the detection target information 900 from the server device 300 to the terminal device 200 through the communication unit 330 (Step S505). The content of the detection target information 900 may be, for example, information simply about presence of the detection target object 810, absence of the detection target, presence or absence of the detection target object 810, or presence or absence of the detection target object 810, such as "presence of the detection target object 810", "absence of the detection target object 810", "presence of one detection target object 810, and absence of another detection target object 810", or the like, or one of the first category A to the fourth category D described above may be assigned, or the number of detection target objects 810 may be included. Accordingly, Step S500 ends. Then, the process proceeds to Step S600.

Step S600 is a step corresponding to the output process in the above-described embodiment. In Step S600, in the terminal device 200, the communication unit 260 receives the detection target information 900, and the output unit 250 outputs a voice on the basis of the content of the detection target information 900.

For example, when the content of the detection target information 900 is "presence of the detection target object 810", the output unit 250 outputs a voice such as " . . . (detection target object 810) has been captured" on the basis of the result. Furthermore, when the content of the detection target information 900 is "absence of the detection target object 810", the output unit 250 outputs a voice such as "detection target object 810 could not be captured." on the basis of the result. Furthermore, if the content of the detection target information 900 is "there is one detection target object 810, and there is no other detection target object 810", the output unit 250 outputs a voice such as " . . . (one detection target object 810) could be captured, but . . . (another detection target object 810) could not be captured". When the voice output is completed, the process proceeds to Step S700.

In Step S700, the second instruction operation s2 is received. In Step S700, when the input unit 240 receives the second instruction operation s2 (YES), the communication unit 260 transmits information on the second instruction operation s2 to the server device 300, and the process proceeds to Step S800. In a case where the input unit 240 has not received the second instruction operation s2 (in the case of NO), Step S700 is ended, and the operation of the information processing device 100 is ended. The fact that the second instruction operation s2 has not been received may be determined on the basis of a condition that a preset reception time has elapsed without an input to the input unit 240, or may be determined on the basis of a condition that a predetermined time has elapsed without an input to the input unit 240 after a voice such as "Is there another instruction?" is output from the output unit 250 after a reception time to the input unit 240 has elapsed and the user is confirmed.

In Step S800, the server device 300 that has received the second instruction operation s2 determines the presence or absence of the desired target object 820 related to the second instruction operation s2 from the upload target image 800 in the redetermination unit 313, and transmits the result to the terminal device 200 as the desired target information 1000. The desired target information 1000 may be, for example, information regarding simply presence of the desired target object 820, absence of the desired target object 820, presence or absence of the desired target object 820, such as "presence of the desired target object 820", "absence of the desired target object 820", or "presence of one desired target object 820, and absence of another desired target object 820", or may be information to which one of the first category A to the fourth category D described above is assigned, or may include the number of desired target objects 820.

When the terminal device 200 receives the desired target information 1000, the output unit 250 outputs a voice on the basis of the content of the desired target information 1000 (Step S900).

For example, if the content of the desired target information 1000 is "presence of the desired target object 820", the output unit 250 outputs a voice such as " . . . (desired target object 820) has been captured." on the basis of the result. Furthermore, when the content of the desired target information 1000 is "absence of the desired target object 820", the output unit 250 outputs a voice such as "the desired target object 820 could not be captured" on the basis of the result. Furthermore, if the content of the desired target information 1000 is "there is one desired target object 820, and there is no other desired target object 820", the output unit 250 outputs a voice such as " . . . (one desired target object 820) could be captured, but . . . (the other desired target object 820) could not be captured". As a result, the operation of the information processing device 100 ends.

According to the first example, since the setting of the detection target object 810 is performed on the basis of the trigger and the basic information 500 related to the upload target image 800, it is possible to reduce a trouble for the user of the information processing device 100 to set the detection target object 810 in detail in advance. Then, since the presence of the detection target object 810, the absence of the detection target object 810, or the presence or absence of the detection target object 810 is reported by the output unit 250, the driver can check in real time that the detection target object 810 has been acquired, that the detection target object 810 has not been acquired, or whether or not the detection target object 810 has been acquired. Therefore, the detection target object 810 is set according to various imaging situations such as when the basic information 500 satisfies a predetermined condition or when the first instruction operation s1 is received, and it is possible to confirm that the detection target object 810 has been captured, has not been captured, or has been captured in real time. Furthermore, the processing cost of the information processing device 100 is reduced by selectively setting the detection target object 810. Furthermore, since the detection target object 810 is selectively reported also in the voice output to the user, it is possible to perform report in which necessary information is appropriately selected without making the user feel troublesome.

In addition, since it is possible to confirm in real time that the detection target object 810 could not be captured, it is possible to quickly respond to the fact that the detection target object 810 could not be captured.

Furthermore, the output unit 250 may include a speaker (voice output device), and in this case, any of the presence of the detection target object 810, the absence of the detection target object 810, and the presence or absence of the detection target object 810 is output by voice. Therefore, for example, in a case where the information processing device 100 has an image display function, it is possible to confirm whether or not the image of the detection target object 810 has been acquired in real time without the driver interrupting driving or checking the image by distracting from driving. Furthermore, since the output unit 250 can include a speaker, the present invention can also be applied to a terminal that does not have an image display function.

In addition, since the setting of the detection target object 810 can be performed on the server device 300 side, a load on the terminal device 200 side can be reduced.

In addition, the first instruction operation s1 serving as a trigger for setting the upload target image 800 can be performed by the user's utterance, and the detection target object 810 does not need to be included in the utterance. Therefore, for example, the user only needs to make a simple utterance such as "capture an image", and it is possible to reduce time and effort to set the detection target object 810 in detail.

In addition, various imaging situations can be used as a trigger for setting the upload target image 800, and various detection target objects 810 according to the imaging situations can be set from the upload target image 800. Therefore, for example, in a case where the vehicle detects sudden braking, the upload target image 800 can be set with acceleration information as a trigger, and a vehicle other than the vehicle (in this case, a vehicle that may have caused sudden braking) or a license plate of the vehicle can be set from the upload target image 800 as the detection target object 810.

Furthermore, in a case where the information on the desired target object 820 is not included in the content of the report by the output unit, the user who has received the report by the output unit can receive the re-report regarding the presence or absence of the desired target object 820. Therefore, even in a case where the setting of the detection target object 810 by the detection target setting unit 311 is different from the user's desire, it is possible to reliably confirm the presence or absence of the desired target object 820.

Example 2

Next, an information processing device 100 according to a second example of the present example will be described with reference to FIG. 7. The same parts as those in the first example described above are denoted by the same reference numerals, and the description thereof will be omitted or simplified.

Figure 7:
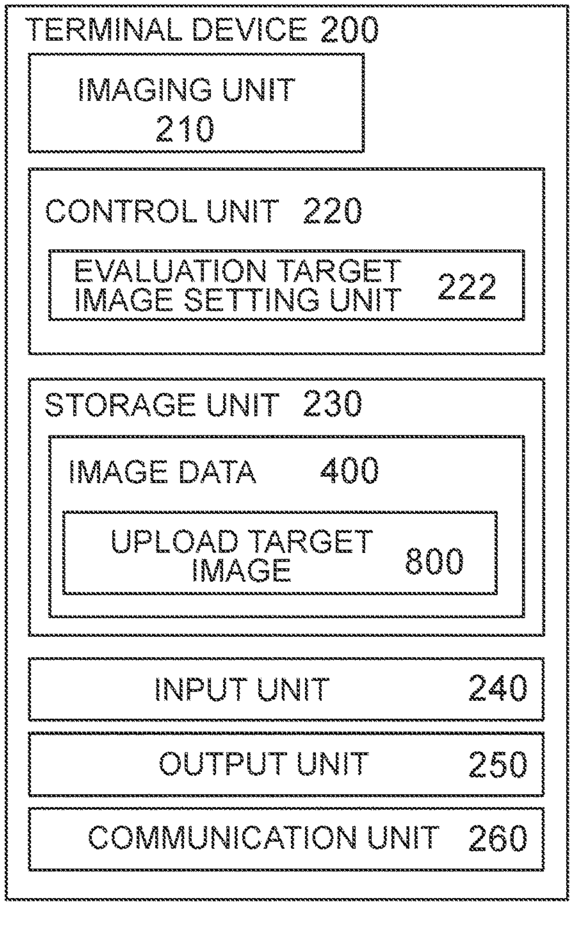
FIG. 7 is a schematic configuration diagram of an information processing device according to a second example of the present invention.
Figure 7:
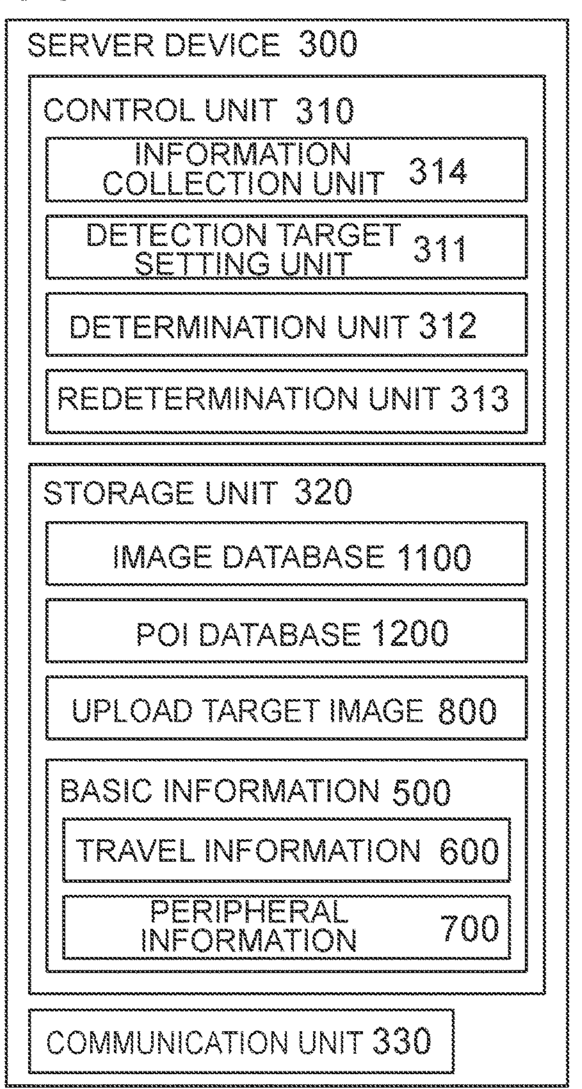

In an information processing device 100 according to the present example, as illustrated in FIG. 7, an information collection unit 314 is provided in a control unit 310 of a server device 300. The information collection unit 314 corresponds to the information collection unit 221 in the first example. That is, the second example is different from the first example in that the information collection unit 314 is mounted on the server device 300, and a basic information 500 is stored in a storage unit 320 on the server device 300 side.

An operation (information processing method) of the information processing device 100 having this configuration will be described. Although the operation of the information processing device 100 of the present example is partially different from that of the first example in a device to be processed, a flow (steps) of the operation is similar to that of the first example, and thus will be described with reference to FIG. 5.

First, in the terminal device 200, the imaging unit 210 starts continuous imaging, and the obtained image data 400 is stored in the storage unit 230. In addition, the information collection unit 314 of the server device 300 accesses the terminal device 200, starts to acquire the basic information 500 from a global positioning system (GPS) receiver, various sensors such as a gyro sensor and an acceleration sensor, an external device that transmits weather information and traffic information, or the like, and stores the acquired basic information 500 in the storage unit 320 for each time (Step S100). Step S100 is a step corresponding to the information collection process and the imaging process in the above-described embodiment.

Next, the evaluation target image setting unit 222 monitors the storage unit 320 of the server device 300 and the input unit 240 of the terminal device 200 by the trigger detection unit 2221, and determines whether or not a trigger is detected (Step S200). The content of the trigger is as described above. If the result of the determination in Step S200 is YES, the process proceeds to Step S300, and if NO, the process returns to Step S100.

In Step S300, the extraction unit 2222 of the evaluation target image setting unit 222 sets image data for a predetermined time including the time of detection of the trigger among the image data 400 temporarily stored in the storage unit 230 as the upload target image 800 and extracts the same from the image data 400.

Then, the information on the trigger detected by the trigger detection unit 2221 and the basic information 500 corresponding to the time of the upload target image 800 are attached to the extracted upload target image 800, and transmitted to the server device 300 through the communication unit 260 (Step S400). The above Steps S200 to S400 are steps corresponding to the evaluation target image setting process in the above-described embodiment. Upon completion of Step S400, the process proceeds to Step S500.

In Step S500, the detection target object 810 is set, and it is determined whether or not the detection target object 810 is in the upload target image 800. In Step S500, first, the captured object specification unit 3111 analyzes the upload target image 800 using a known method such as pattern matching, and specifies a captured object in the upload target image 800. Next, the scene specification unit 3112 specifies a situation in which the upload target image 800 is captured with reference to the information of the trigger and the basic information 500 given to the upload target image 800, and classifies the situation for each category. This category is similar to the first category A, the second category B, the third category C, and the fourth category D of the first embodiment.

When the upload target image 800 is classified into each category, the determination unit 3113 determines the detection target object 810 according to the category. Next, when the detection target object 810 is determined, the determination unit 312 determines the presence or absence of the detection target object 810 from the upload target image 800, and transmits the result as the detection target information 900 from the server device 300 to the terminal device 200 through the communication unit 330. The content of the detection target information 900 is similar to that of the first example. Accordingly, Step S500 ends. Then, the process proceeds to Step S600.

Step S600 is a step corresponding to the output process in the above-described embodiment. In Step S600, in the terminal device 200, the communication unit 260 receives the detection target information 900, and the output unit 250 outputs a voice on the basis of the content of the detection target information 900. The content of the voice output is similar to that of the first example. When the voice output is completed, the process proceeds to Step S700.

In Step S700, the second instruction operation s2 is received. In Step S700, when the input unit 240 receives the second instruction operation s2 (YES), the process proceeds to Step S800. In a case where the input unit 240 has not received the second instruction operation s2 (in the case of NO), Step S700 is ended, and the operation of the information processing device 100 is ended.

In Step S800, the redetermination unit 313 detects that the input unit 240 has received the second instruction operation s2, determines the presence or absence of the desired target object 820 related to the second instruction operation s2 from the upload target image 800, and transmits the result to the terminal device 200 as the desired target information 1000. The content of the desired target information 1000 is similar to that of the first example.

When the terminal device 200 receives the desired target information 1000, the output unit 250 outputs a voice on the basis of the content of the desired target information 1000 (Step S900). The content of the voice output is similar to that of the first example. As a result, the operation of the information processing device 100 ends.

According to the second example, since the basic information 500 can be collected on the server device 300 side, the load on the terminal device 200 side can be reduced.

Example 3

Figure 8:
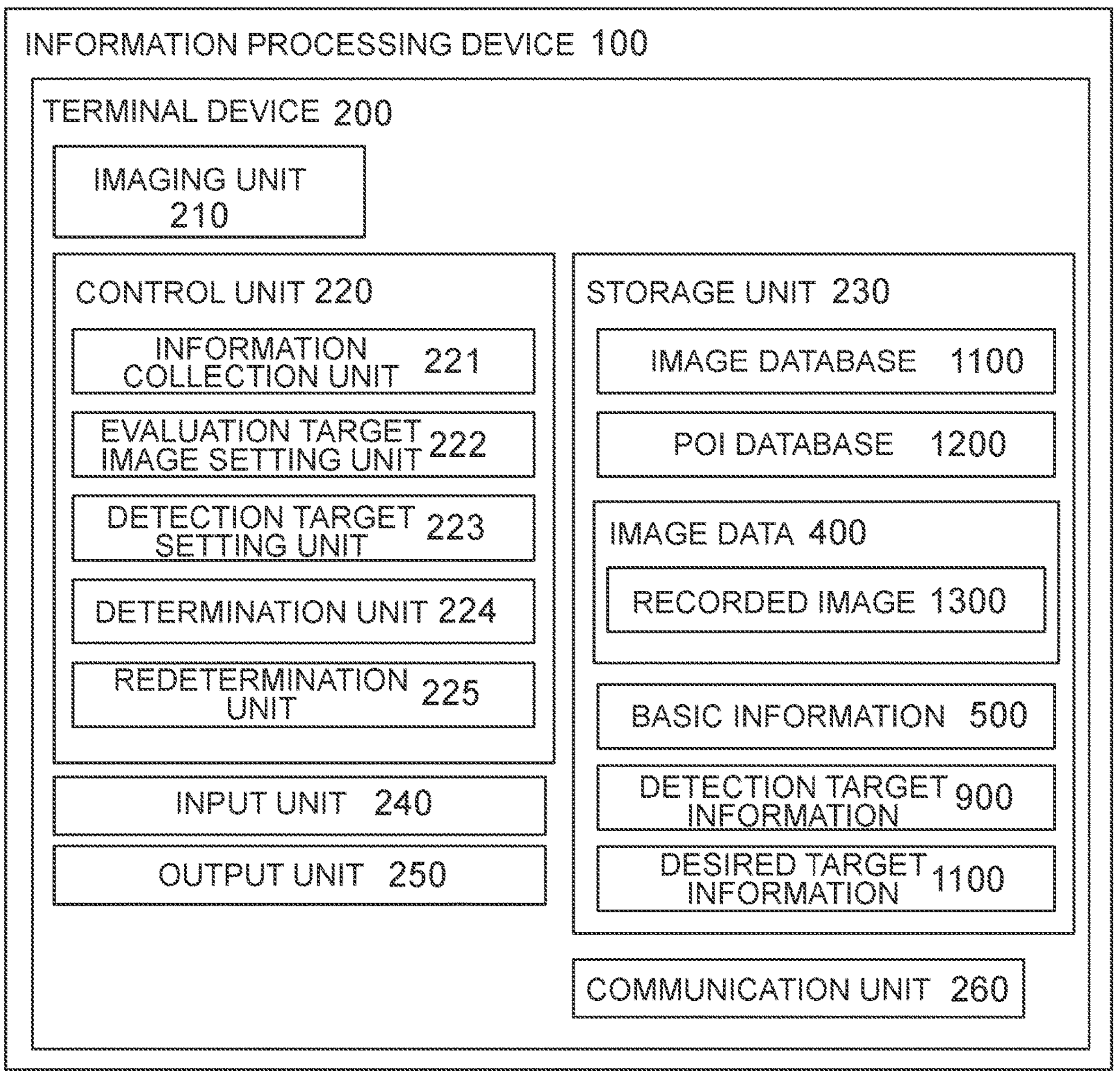
FIG. 8 is a schematic configuration diagram of an information processing device according to a third example of the present invention.

Next, an information processing device 100 according to a third example of the present example will be described with reference to FIG. 8. The same parts as those in the first example described above are denoted by the same reference numerals, and the description thereof will be omitted or simplified.

In the information processing device 100 according to the present example, the above-described server device 300 is omitted, and the configuration included in a control unit 310 of the server device 300 is implemented in a control unit 220 of a terminal device 200. In addition, the configuration included in a storage unit 320 of a server device 300 is implemented in a storage unit 230 of the terminal device 200. That is, the information processing device 100 is configured by the terminal device 200 without the server device 300. The control unit 220 includes a detection target setting unit 223, a determination unit 224, and a redetermination unit 225 in addition to the configuration of the first example. The detection target setting unit 223 corresponds to the detection target setting unit 311 in the server device 300. Although not illustrated, the detection target setting unit 223 includes a captured object specification unit 3111, a scene specification unit 3112, and a determination unit 3113 as in the first example. The determination unit 224 corresponds to the determination unit 312 in the server device 300. The redetermination unit 225 corresponds to the redetermination unit 313 in the server device 300. Configurations and operations of the detection target setting unit 223, the determination unit 224, and the redetermination unit 225 are substantially the same as those of the first example, and thus detailed description thereof will be omitted.

The storage unit 230 stores an image database 1100 and a POI database 1200 in addition to the configuration of the first example. The image database 1100 and the POI database 1200 are substantially the same as those stored in the storage unit 320 of the server device 300 in the first example.

As described above, the information collection unit 221, the imaging unit 210, the evaluation target image setting unit 222, the detection target setting unit 223, and the output unit 250 are provided in the terminal device 200 moving together with the moving body.

Note that, in the first example, when the trigger detection unit 2221 of the evaluation target image setting unit 222 detects the trigger, the extraction unit 2222 sets the image data for the predetermined time including the time of detection of the trigger in the image data 400 temporarily stored in the storage unit 230 as the upload target image 800 as the evaluation target image and extracts the same from the image data 400. However, in the present example, since the server device 300 is not used, when the trigger detection unit 2221 detects the trigger, the extraction unit 2222 sets the image data for a predetermined time among the image data 400 temporarily stored in the storage unit 230 as a non-overwriting recorded image 1300 and extracts the same from the image data 400. In the present example, the recorded image 1300 configures an evaluation target image in the above-described embodiment.

Next, an operation (information processing method) of the information processing device 100 having the above-described configuration will be described. Although the operation of the information processing device 100 of the present example is partially different from that of the first example in a device to be processed, a flow (steps) of the operation is similar to that of the first example, and thus will be described with reference to FIG. 5.

Steps S100 to S200 are the same as those in the first example, and thus description thereof is omitted.

In Step S300, the extraction unit 2222 of the evaluation target image setting unit 222 sets the image data for a predetermined time including the time of trigger detection among the image data 400 temporarily stored in the storage unit 230 as the non-overwriting recorded image 1300 and extracts the same from the image data 400.

Then, information on the trigger detected by the trigger detection unit 2221 and basic information 500 corresponding to the time of the recorded image 1300 are given to the extracted recorded image 1300 (Step S400). The above Steps S200 to S400 are steps corresponding to the evaluation target image setting process in the above-described embodiment. Upon completion of Step S400, the process proceeds to Step S500.

In Step S500, the detection target object 810 is set, and it is determined whether or not the detection target object 810 is in the recorded image 1300. In Step S500, first, the captured object specification unit 3111 analyzes the recorded image 1300 using a known method such as pattern matching, and specifies the captured object in the recorded image 1300. Next, the scene specification unit 3112 specifies a situation in which the recorded image 1300 has been captured with reference to the information on the trigger and the basic information 500 given to the recorded image 1300, and classifies the situation into categories. This category is similar to the first category A, the second category B, the third category C, and the fourth category D of the first embodiment.

When the recorded image 1300 is classified into each category, the determination unit 3113 determines the detection target object 810 according to the category. Next, when the detection target object 810 is determined, the determination unit 224 determines the presence or absence of the detection target object 810 from the recorded image 1300, and stores the result in the storage unit 230 as the detection target information 900. The content of the detection target information 900 is similar to that of the first example. Accordingly, Step S500 ends. Then, the process proceeds to Step S600.

Step S600 is a step corresponding to the output process in the above-described embodiment. In Step S600, the output unit 250 outputs a voice on the basis of the content of the detection target information 900 stored in the storage unit 230. The content of the voice output is similar to that of the first example. When the voice output is completed, the process proceeds to Step S700.

In Step S700, the second instruction operation s2 is received. In Step S700, when the input unit 240 receives the second instruction operation s2 (YES), the process proceeds to Step S800. In a case where the input unit 240 has not received the second instruction operation s2 (in the case of NO), Step S700 is ended, and the operation of the information processing device 100 is ended.

In Step S800, the redetermination unit 225 detects that the input unit 240 has received the second instruction operation s2, determines the presence or absence of the desired target object 820 related to the second instruction operation s2 from the recorded image 1300, and stores the result in the storage unit 230 as the desired target information 1000. The content of the desired target information 1000 is similar to that of the first example.

When the desired target information 1000 is stored in the storage unit 230, the output unit 250 outputs a voice on the basis of the content of the desired target information 1000 (Step S900). The content of the voice output is similar to that of the first example. As a result, the operation of the information processing device 100 ends.

According to the third example, the information processing device 100 can be configured by the terminal device 200 without the server device 300 or the like.

Note that the present invention is not limited to the above Examples. That is, those skilled in the art can make various modifications without departing from the gist of the present invention according to conventionally known knowledge. As long as the display device of the present invention is included by such a modification, it is naturally included in the scope of the present invention.

In the first example, the second example, and the third example described above, the output unit 250 is configured by an audio output device such as a speaker, but the output unit 250 is not limited to a device that performs voice output. The output unit 250 may cause an external device other than the terminal device 200 to output a sentence.

For example, the external device may be a smartphone of a user who desires to monitor the own vehicle during parking, and when the trigger is detected, the content of the detection target information 900 and the desired target information 1000 as output by voice from the output unit 250 may be displayed as a report sentence on the smartphone as the external device.

Furthermore, the external device other than the terminal device 200 may be a server device of an insurance company with which the vehicle corresponding to the terminal device 200 subscribes or a server device of an administrator (for example, an administrator or the like of the delivery vehicle) who manages the vehicle corresponding to the terminal device 200, and these server devices may be output units, and the contents of the detection target information 900 and the desired target information 1000 may be displayed as a report sentence.

When the determination unit 3113 determines the detection target object 810, the detection target object 810 may be further limited using the position information at the time of image capturing. Specifically, in a case where it can be determined that there is no crosswalk or signal around the position of the vehicle on the basis of the position information of the vehicle at the time of detecting the trigger, the information of the POI database 1200 recorded in the storage unit 320, or the like, the crosswalk or signal may be excluded as the detection target object 810. This makes it possible to avoid a bothersome situation in which it is known that there is no information in advance but it is purposely reported that there is no information, and it is possible to avoid unnecessary report by the output unit 250.

On the other hand, in a case where it can be determined that there is a crosswalk or a signal around the position of the vehicle on the basis of the position information of the vehicle at the time of detecting the trigger, the information of the POI database 1200 recorded in the storage unit 320, and the like, the crosswalk or the signal may be always determined as the detection target object 810. As a result, the user can reliably recognize that the image cannot be captured well although the image should be captured.

Furthermore, in a case where the information processing device 100 is used for monitoring the host vehicle during parking, the following configuration may be provided. That is, the evaluation target image setting unit 222 is configured such that "the extraction unit 2222 extracts images from immediately before to immediately after detection of a trigger as an evaluation target image.", and in a case where the license plate of the other vehicle that has caused the trigger cannot be detected, "the image at the time further back from the time immediately before the detection of the trigger is reset as the evaluation target image". Then, the presence or absence of the license plate is determined for the re-set evaluation target image. This makes it possible to increase the possibility of acquiring information of a license plate of another vehicle that has not been captured due to circumstances such as a camera angle of view.

In addition, in a case where the above-described "detection of the tailgating behavior of another vehicle" is a predetermined condition detected by the trigger detection unit 2221, when the vehicle and the license plate thereof are determined as the detection target object 810, a specific vehicle that is performing an action considered as tailgating such as widening or meandering and the license plate thereof may be determined as the detection target object 810.

REFERENCE SIGNS LIST s1 First instruction operation (instruction operation)
100 Information processing device
210 Imaging unit
221 Information collection unit
222 Evaluation target image setting unit
311 Detection target setting unit
500 Basic information
600 Travel information
700 Peripheral information
800 Image to be uploaded (image to be evaluated)
810 Detection target object
250 Output unit

The invention claimed is:

1. An information processing device comprising:
one or more processors configured to perform operations of the following units including:
an information collection unit that collects basic information including travel information of a moving body and peripheral information of the moving body;
an imaging unit that continuously captures images;
an evaluation target image setting unit that sets, as an evaluation target image, an image for a predetermined time from among images captured by the imaging unit, with either a case where the basic information satisfies a predetermined condition or a case where an instruction operation is received as a trigger;

a scene specification unit that classifies a situation in which the evaluation target image is captured into two or more categories, based on the trigger related to the evaluation target image and the basic information;

a detection target setting unit that sets a detection target object from the evaluation target image in response to the corresponding categories that are classified by the scene specification unit, the detection target object being included in the evaluation target image; and an output unit that reports that the detection target object set from the evaluation target image has been present and in a case in which a second instruction operation is received in response to the detection target object not being a desired detection target object, the output unit further reporting a redetermination result regarding whether the detection target object is present in the evaluation target image.

2. The information processing device according to claim 1, wherein the output unit includes a voice output device that outputs a voice.

3. The information processing device according to claim 1, wherein the information collection unit, the imaging unit, the evaluation target image setting unit, and the output unit are provided in a terminal device that moves together with the moving body, the detection target setting unit is provided in a server device configured to communicate with the terminal device, the evaluation target image includes an upload target image that can be uploaded to the server device, and the upload target image is transmitted from the terminal device to the server device, and the detection target information related to the detection target object is transmitted from the server device to the terminal device.

4. The information processing device according to claim 1, wherein the imaging unit, the evaluation target image setting unit, and the output unit are provided in a terminal device that moves together with the moving body, the information collection unit and the detection target setting unit are provided in a server device configured to communicate with the terminal device, the evaluation target image includes an upload target image that can be uploaded to the server device, and the upload target image is transmitted from the terminal device to the server device, and the detection target information related to the detection target object is transmitted from the server device to the terminal device.

5. The information processing device according to claim 1, wherein the information collection unit, the imaging unit, the evaluation target image setting unit, the detection target setting unit, and the output unit are provided in a terminal device that moves together with the moving body, and the evaluation target image includes a non-overwriting recorded image.

6. The information processing device according to claim 1, wherein the instruction operation is performed by utterance of an operator who performs the instruction operation, and the utterance does not include the detection target object.

7. The information processing device according to claim 1, wherein the travel information includes at least one of information on acceleration of the moving body, position information of the moving body, information on a traveling direction of the moving body, and information on parking or stopping of the moving body, the peripheral information includes at least one of time information, weather information, and traffic jam status information, and the detection target object includes at least one of a moving body other than the moving body, a license plate, a person, an animal other than the person, a traffic light, a road sign, a road surface sign, and a predetermined landmark.

8. The information processing device according to claim 1, wherein, in a case where the detection target object to be output is not a desired target object desired by an operator who performs the instruction operation and the instruction operation is repeated by the operator, the output unit reports any one of presence of the desired target object, absence of the desired target object, and presence or absence of the desired target object from the evaluation target image.

9. An information processing device comprising:

one or more processors configured to perform operations of the following units including:

an information collection unit that collects basic information including travel information of a moving body and peripheral information of the moving body;

an imaging unit that continuously captures images;

an evaluation target image setting unit that sets, as an evaluation target image, an image for a predetermined time from among images captured by the imaging unit, with either a case where the basic information satisfies a predetermined condition or a case where a first instruction operation is received as a trigger;

a detection target setting unit that sets a detection target object from the evaluation target image, the detection target object being included in the evaluation target image, based on the trigger related to the evaluation target image and the basic information; and an output unit that reports that the detection target object set from the evaluation target image has been present, wherein, after reporting that the detection target object has been present and in a case in which a second instruction operation is received in response to the detection target object not being a desired detection target object, the output unit further reports a redetermination result regarding whether the detection target object is present in the evaluation target image.

10. The information processing device according to claim 9, wherein the output unit includes a voice output device that outputs a voice.

11. The information processing device according to claim 9, wherein the information collection unit, the imaging unit, the evaluation target image setting unit, and the output unit are provided in a terminal device that moves together with the moving body, the detection target setting unit is provided in a server device configured to communicate with the terminal device, the evaluation target image includes an upload target image that can be uploaded to the server device, and the upload target image is transmitted from the terminal device to the server device, and the detection target information related to the detection target object is transmitted from the server device to the terminal device.

12. The information processing device according to claim 9, wherein the imaging unit, the evaluation target image setting unit, and the output unit are provided in a terminal device that moves together with the moving body, the information collection unit and the detection target setting unit are provided in a server device configured to communicate with the terminal device, the evaluation target image includes an upload target image that can be uploaded to the server device, and the upload target image is transmitted from the terminal device to the server device, and the detection target information related to the detection target object is transmitted from the server device to the terminal device.

13. The information processing device according to claim 9, wherein the information collection unit, the imaging unit, the evaluation target image setting unit, the detection target setting unit, and the output unit are provided in a terminal device that moves together with the moving body, and the evaluation target image includes a non-overwriting recorded image.

14. The information processing device according to claim 9, wherein the instruction operation is performed by utterance of an operator who performs the instruction operation, and the utterance does not include the detection target object.

15. The information processing device according to claim 9, wherein the travel information includes at least one of information on acceleration of the moving body, position information of the moving body, information on a traveling direction of the moving body, and information on parking or stopping of the moving body, the peripheral information includes at least one of time information, weather information, and traffic jam status information, and the detection target object includes at least one of a moving body other than the moving body, a license plate, a person, an animal other than the person, a traffic light, a road sign, a road surface sign, and a predetermined landmark.

16. The information processing device according to claim 9, wherein, in a case where the detection target object to be output is not a desired target object desired by an operator who performs the instruction operation and the instruction operation is repeated by the operator, the output unit reports any one of presence of the desired target object, absence of the desired target object, and presence or absence of the desired target object from the evaluation target image.

17. An information processing device comprising:

one or more processors configured to perform operations of the following units including:

an information collection unit that collects basic information including travel information of a moving body and peripheral information of the moving body;

an imaging unit that continuously captures images;

an evaluation target image setting unit that sets, as an evaluation target image, an image for a predetermined time from among images captured by the imaging unit, with either a case where the basic information satisfies a predetermined condition or a case where a first instruction operation is received as a trigger;

a detection target setting unit that sets a detection target object from the evaluation target image, the detection target object being included in the evaluation target image, based on the trigger related to the evaluation target image and the basic information; and an output unit that reports absence of the detection target object set from the evaluation target image, wherein, after reporting that the detection target object is absent and in a case in which a second instruction operation is received, the output unit further reports a redetermination result regarding whether the detection target object is present in the evaluation target image.

18. An information processing method executed by a computer, the information processing method comprising:

an information collection step of collecting basic information including travel information of a moving body and peripheral information of the moving body;

an imaging step of continuously capturing images;

an evaluation target image setting step of setting, as an evaluation target image, an image for a predetermined time from among images captured by the imaging step, with either a case where the basic information satisfies a predetermined condition or a case where a first instruction operation is received as a trigger;

a detection target setting step of setting a detection target object from the evaluation target image, the detection target object being included in the evaluation target image, on a basis of the trigger related to the evaluation target image and the basic information; and an output step of reporting that the detection target object set from the evaluation target image has been present, wherein, after reporting that the detection target object has been present in the output step and in a case in which a second instruction operation is received in response to the detection target object not being a desired target object, a redetermination result regarding whether the detection target object is present in the evaluation target image is reported.

19. A non-transitory computer-readable storage medium storing a program that causes a computer to execute the information processing method according to claim 18.

20. An information processing device comprising:

one or more processors configured to perform operations of the following units including:

an information collection unit that collects basic information including travel information of a moving body and peripheral information of the moving body;

an imaging unit that continuously captures images;

an evaluation target image setting unit that sets, as an evaluation target image, an image for a predetermined time from among images captured by the imaging unit, with either a case where the basic information satisfies a predetermined condition or a case where a first instruction operation is received as a trigger;

a detection target setting unit that sets a detection target object from the evaluation target image, the detection target object being included in the evaluation target image, based on the trigger related to the evaluation target image and the basic information; and an output unit that reports presence or absence of the detection target object set from the evaluation target image, wherein, after reporting that the detection target object has been present or absent and in a case in which a second instruction operation is received, the output unit further reports a redetermination result regarding whether the detection target object is present in the evaluation target image.

* * * * *